(12) United States Patent
Lamb

(10) Patent No.: US 8,994,648 B2
(45) Date of Patent: Mar. 31, 2015

(54) PROCESSOR INTERFACE

(75) Inventor: Roland Oliver Lamb, London (GB)

(73) Assignee: Roli Ltd, London (GB)

( * ) Notice: Subject to any disclaimer, the term of this patent is extended or adjusted under 35 U.S.C. 154(b) by 471 days.

(21) Appl. No.: 13/381,306

(22) PCT Filed: Jun. 30, 2010

(86) PCT No.: PCT/GB2010/001267
§ 371 (c)(1),
(2), (4) Date: Apr. 30, 2012

(87) PCT Pub. No.: WO2011/001145
PCT Pub. Date: Jan. 6, 2011

(65) Prior Publication Data
US 2012/0306783 A1    Dec. 6, 2012

(30) Foreign Application Priority Data

Jun. 30, 2009 (GB) ................................ 09251684.8

(51) Int. Cl.
*G09G 5/00* (2006.01)
*G06F 3/041* (2006.01)
*G06F 3/0488* (2013.01)

(52) U.S. Cl.
CPC .......... *G06F 3/0414* (2013.01); *G06F 3/04886* (2013.01); *G06F 2203/04809* (2013.01)
USPC ....................................................... 345/156

(58) Field of Classification Search
CPC .... G06F 3/041; G06F 3/0414; G06F 3/04886
USPC ........ 345/156, 173; 84/423 R, 424, 427, 602, 84/658
See application file for complete search history.

(56) References Cited

U.S. PATENT DOCUMENTS

| 6,703,552 | B2 | 3/2004 | Haken |
| 7,394,010 | B2 | 7/2008 | Nishibori et al. |
| 7,476,952 | B2* | 1/2009 | Vaganov et al. ............... 257/415 |
| 2001/0003326 | A1* | 6/2001 | Okada et al. .................. 200/516 |
| 2003/0079549 | A1 | 5/2003 | Lokhorst et al. |
| 2005/0178214 | A1* | 8/2005 | Okada et al. .................... 73/862 |

(Continued)

FOREIGN PATENT DOCUMENTS

EP    1 100 069 A1    5/2001

OTHER PUBLICATIONS

International Search Report and Written Opinion for parent application PCT/GB2010/001267, having a mailing date of Jun. 16, 2011.
(Continued)

*Primary Examiner* — Joe H Cheng
(74) *Attorney, Agent, or Firm* — Andrus Intellectual Property Law, LLP

(57) ABSTRACT

An interface is for inputting data into a processor. The interface has a three-dimensionally shaped input surface and comprises an array of sensors responsive to forces applied to the input surface and providing an input to the processor capable of registering the magnitude of the forces applied to the array of sensors and interpreting the location of pressure on the input surface, and a three-dimensionally shaped layer of soft resilient material arranged between the three-dimensionally shaped input surface and the array of sensors and capable of transmitting forces exerted on the three-dimensionally shaped input surface to the sensors.

20 Claims, 12 Drawing Sheets

(56) References Cited

U.S. PATENT DOCUMENTS

| | | | |
|---|---|---|---|
| 2005/0190152 A1* | 9/2005 | Vaganov | 345/157 |
| 2007/0040107 A1* | 2/2007 | Mizota et al. | 250/221 |
| 2007/0151835 A1* | 7/2007 | Rakers et al. | 200/313 |
| 2007/0245836 A1* | 10/2007 | Vaganov | 73/862.621 |
| 2008/0105936 A1* | 5/2008 | Nakamura | 257/415 |
| 2009/0256817 A1* | 10/2009 | Perlin et al. | 345/174 |
| 2010/0315337 A1* | 12/2010 | Ferren et al. | 345/158 |

OTHER PUBLICATIONS

European Search Report for priority application EP 09251684, having a completion date of Dec. 9, 2009.

* cited by examiner

PROCESSOR INTERFACE

CROSS-REFERENCE TO RELATED APPLICATIONS

This application is the U.S. national stage application of International Application No. PCT/GB2010/001267, filed Jun. 30, 2010, which International application was published on Jan. 6, 2011 as International Publication No. WO 2011/001145 A2 in the English language and which application is incorporated herein by reference. The International application claims priority of Great Britain Patent Application No.09251684.8, filed Jun. 30, 2009, which application is incorporated herein by reference.

TECHNICAL FIELD

The present invention relates to an interface for providing an input into a processor, i.e. a data processor, and can be used for numerous applications, including producing sound and music, providing signals representative of a wide variety of digital commands, providing the input of alphanumerical characters into a memory and/or a display, performing word or number processing functions or for generating signals providing remote movement or remote control of objects in real space or in a virtual environment, e.g. vehicle movement, or moving a remote robotic device or instrument, for example a surgical instrument. Especially, it relates to interfaces which simultaneously enable multiple kinds of inputs, including those denoting discrete commands, spatial location, and pressure-level. Numerous other applications will be evident to the skilled person on the basis of the discussion below.

BACKGROUND FIELD

Currently, most user interfaces fall into one of two categories, which can be called "Discrete Control Interfaces (DCI)" which use a set of discrete switches which can register an on or off position to enable simple discrete inputs, and "Continuous Action Interfaces (CAI)", which register spatial, pressure-based, or gestural movement in time to enable more complex inputs based on continuous movement. DCI include keyboards, keypads, and other interfaces that use direct analog (usually switch-based) controls that usually simulate a mechanical action, while CAI include touch screens, touchpads, other two-dimensional touch sensitive interfaces, and devices like a computer mouse, which use a rolling ball or some other continuous action apparatus that allows for continuous input.

The advantages of DCI interfaces are (1) that they allow for clear discrete inputs, and (2) that they typically form a tactile input feedback system and thus do not rely on visual confirmation. In other words, they provide clear separate commands, and they give the user tactile information about which commands have registered, since the user can feel a responding pressure when he depresses a key, for example. These advantages relate not just to the kind of sensing device but also to the design of the input surface, the topmost part of the interface with which the user actually interacts. Here the springing quality of a typing keyboard allows the user to understand at the level of tactile perception that a key has been depressed, and the contours of the individual keys allows the user to make micro-adjustments to facilitate constant, fast, accurate typing without having to look at the keyboard. The various commands given by DCI can be memorised and can often be carried out without conscious thought and so information is usually faster and more accurately inputted than is the case with visually-based input control, especially when the DCI interface provides a tactile response. This can be seen by comparing the difference in speed between touch-typing (which depends on tactile-information feedback about finger location and activity, as well as habitual skill) and "hunting and pecking" typing (visually-based input control), or attempting to type on a touch screen interface. Another example is the difference between a virtuosic pianist (who uses tactile information about finger location and action, and habitual skill) vs. a beginner pianist who needs to look at the keys to orient himself as to which notes to play (visually-based tactile input control). These highly skilled activities depend on practice, and the reason practice is effective in these areas is that one can train one's muscular memory to repeat certain delimited tasks without conscious direction or control. In order for such training to be possible though, there are three requirements: a) the activity must not inherently require visual confirmation and direction (activities that require visual confirmation, like shooting a target, can of course also be practiced, but those involve a different form of practice involving hand/eye/body coordination); b) the physical interface must give positional tactile feedback (in the sense that a flat or merely decorated surface does not, and thus some kind of variation in surface, texture, or resiliency can consistently give the user something tactile to which to spatially orient his or her trained automatic muscular adjustments and correction); and c) these physical qualities of the interface have to be standardized and unchanging, so that they provide very similar tactile information in every instance.

The disadvantage of DCIs is that they are limited in the types of input that can be made, especially when the goal is to input quantitative or continuous information, as opposed to qualitatively separate, distinct commands.

On the other hand, CAIs have the advantage of allowing for continuous input and subtle or complex forms of information to be communicated very quickly. When, for example, a touch-sensitive interface is, or is connected to, a screen with changing information, it can be used to control a huge possible set of changing variables. The visual information can communicate innumerable options and then the pointer, whether one's finger or an arrow controlled by a mouse, can move to and select a particular set of movements and commands. Furthermore, this kind of input can simulate continuous human actions like handwriting or drawing in a way that would be impossible with a DCI. Their disadvantages however, are that (1) they are not as effective for processing a series of separate commands in rapid succession, in part because (2) they generally do not, in their current structure, provide a viable tactile feedback system in response to an input.

It is therefore unsurprising that these two types of interface are often used in conjunction the computer keyboard and touchpad on most laptops is one example. The DCI aspect of the interface allows for discrete commands and rapid input for regular commands, like typing, while the CAI interface allows for more general control of the digital environment and any functions that require motion or continuity. Of course, while interfaces like a touchpad or a mouse are primarily CAI designed to register movement in time, they do allow for discrete inputs through their clicking or selecting function, and this combination of functions into one interface explains their immense usefulness.

Multitouch gestures are well known, and these allow for other kinds of particular commands to be inputted into a CAI type interface, thus providing a further hybrid experience. A "gesture" signifies a single control of an interface, which may be a pattern simultaneously activated inputs such as the pressing of a letter key and the shift key to cause a capital letter to appear on a word processor screen.

A certain degree of complexity is added in the case of pressure-sensitive interfaces. A variable pressure-sensing interface can be continuous with respect to pressure in the sense that it can register a continuous flow of data about different levels of pressure, while being discrete with respect the spatial distribution of pressure sensitive areas, depending on how many pressure sensors are used and how they are arrayed.

Specific instances of relevant known equipment are:

US 2003/0079549 discloses a pressure-sensitive device for accurately localising point sources of pressure and a method for determining the location force of a point pressure source on a pressure sensitive surface. It introduces the use of a internal membrane between the topmost surface in which the user inputs information, and the lower level in which the sensors actually read the data. This internal membrane can be made of a range of different materials and shapes, and can enable more accurate and balanced locational detection using fewer sensors than would otherwise be possible. It does not relate, however, to variations in the topmost surface other than protrusions to increase its hardness. Since the focus of the document is providing for more efficient ways of creating two-dimensional pressure sensing devices, (both in the sense that it gathers pressure data on an x and y axis, and in that the topmost surface is two-dimensional, it does not provide solutions for creating hybrid solutions for multiple pressure and spatially based discrete and continuous inputs.

U.S. Pat. No. 6,703,552 discloses an electronic musical keyboard having a two-dimensional playing surface, i.e. it does not include discrete keys such as those present on pianos and similarly configured electronic musical keyboards. The keyboard continually measures each of the player's finger's pressure as it is pushed down on the keyboard to produce a sound. Because the surface is flat, it uses a program that automatically 'guides' the pitch to one of the main twelve tone notes if the player is close to one, which means that it has a somewhat inorganic sound, and it is very difficult to play it in a virtuosic way in this setting, because the computer is doing too much of the work. Also, it is difficult for a player to know precisely where his figures are on the keyboard because he has no information about the exact location of his fingers in relationship to the keys. It is a continuous, variable pressure and spatial-sensing interface that uses software algorithms to generate somewhat discrete effects.

U.S. Pat. No. 7,394,010 discloses a musical instrument including an array of key switches for generating different tones. The switches are arranged in a two dimensional grid and sounds are produced by touching different key switches in the grid.

EP 1100069 discloses a keyboard; the object of the keyboard is to simplify the electronic circuitry to detect the depression of keys. The keyboard includes a number of different buttons, each of which includes a number of contacts. The depression of each button closes a predetermined combination of the contacts and the combination differs from button to button. Therefore, by scanning the contacts periodically it is possible to tell which button is depressed.

Electronic musical keyboards are, of course, very well known. They mimic a piano keyboard and include a number of different discrete notes. The notes can be modified to generate different sounds, e.g. a piano or an organ. However, the number of musical effects that is possible to achieve in real time with such a keyboard is limited.

"Rollup" piano keyboards are also known. These take the form of a flexible substrate having a surface showing a two dimensional outline of a piano keyboard. Underneath each key, there is a contact which, when pressed, will produce a signal that instructs a processor and loud speaker to output a sound corresponding the key pressed. However, the operator gets very little tactile feedback and it is often difficult to know exactly where the figures are on the keyboard.

Keyboard interfaces on touch screens are also well-known. They do not provide any tactile feedback that tells the user where his fingers are and so data entry will be done visually, i.e. not by touch typing. Also touch screens to not give a tactile feedback when the "key" is pressed sufficiently to register that the keystroke has resulted in the data being entered, although sometimes feedback is given in visual form (the key changes colour on the screen) or audible form (a "bleep" is sounded).

DISCLOSURE OF THE INVENTION

The present invention is defined in the accompanying claims.

Broadly stated, the present invention provides an interface allowing a user to make an input into a processor. The interface includes a three dimensional input surface which provides tactile feedback to the user so that he knows where his fingers are on the interface. For ease of description, the input surface will sometimes be referred to in this specification as the "top" surface because it will sometimes be provided on the top of the interface (and other components of the interface will also be described by reference to such an interface orientation), but it should be remembered that the interface may be used in any desired orientation, e.g. with the input surface on a side or underneath surface, and the present specification covers the interface in any orientation. Furthermore, in many cases a given interface will consist of multiple surfaces where information could be inputted. Indeed, It could even be a totally enclosing surface with a top, bottom and sides. The input surface is simply the outermost part of the interface which is actually subject to the user's touch, in whatever form that takes.

Soft resilient material, for example silicone rubber, is provided underneath (or within) the three-dimensional top input surface and indeed a surface of a layer of such soft resilient material could form the three-dimensional top surface. The top surface could be made, however, or any material that allowed for the diffusion of force or otherwise allowed for touch sensitivity. It could be made with a flexible OLED screen even, or a three-dimensional resistive or capacitive touch surface.

The interface provides three distinct forms of tactile feedback to the user. Firstly, the texture, angle, and other characteristics of the three-dimensional top surface give the user immediate information about the location of the touch, in a way that would be impossible on a flat uniform surface where there is no tactile basis for spatial orientation. Secondly, the soft resilient material transmits forces back to the user to provide further tactile feedback to the user who will be able to sense the amount of pressure that he is applying to the interface. Because of the elasticity of the material, the response pressure increases exponentially with the distance of compression rather than simply pushing back with the same force as would a flat hard surface. This variation provides more usable tactile information to the user about slight changes in force input. Thirdly, the soft material amplifies the variation in the surface area of the tactile feedback. One of the ways we subjectively estimate the level of pressure with which we touch something, especially at very low levels of pressure input, is the variation in the amount by which the surface area of our finger, for example, touches a given surface. On a flat, hard surface, this difference is small, but with a softer material, the change is magnified, because as the muscle tissue in the finger compresses, so the does the material between the sensor and the input surface, and thus the surface area changes considerably.

The downward force is diffused through the resilient material until it reaches the other side of the material, at which point it is applied to a sensor or an array of sensors, which may be one-dimensional or two dimensional. In some cases, the sensors could also be arrayed onto multiple underlying surfaces and thus constitute a set of two dimensional arrays (which could in turn be described as a three-dimensional array). If one sensor is provided, it must be capable of being able to discern what part of an input surface a user is manipulating and what forces/pressures are being applied at that location, i.e. it must have locational sensing capacity built into it. Each sensor is responsive to the touch of the user on the input surface, e.g. the sensors are pressure-sensitive, and they each output a signal in accordance with the touch-responsive parameter it measures, e.g. the force applied to it.

The resilient material transmits the force applied to the top input surface to the sensors; because of the soft compliant nature of the material, the force is not only transmitted to the sensors located in line with the direction that the force is applied but also to other adjacent sensors. Thus, if a user applies a force to an area of the input surface of the interface, a wider area of the sensor array will register that force, causing a number of sensors to provide an output. The combination of distinct forces reading on a number of sensors will be referred to as a "signature". Algorithms in the processor can respond to the make-up of the signature, including not only which sensors are "triggered", i.e. provide a signal in response to applied pressure, but also the number of sensors, the forces they detect and the relative magnitudes of the outputs. For example, a strong force applied to the top surface will cause a relatively large number of sensors to be activated and produce output signals, as compared to a weaker force, whose effect is more narrowly transmitted by the soft resilient material to the sensors below, thereby triggering a smaller number of sensors. The simplest algorithms along these lines simply allow one to recover a particular location of touch more accurate than one could if one were touching the sensor array directly. If, for example, on a one dimensional array of sensors, three sensors in location A, B and C in a line give a reading of 100, 800, and 500, respectively one can weight the amount of force relative to the spacing of the sensors to recover an exact location of the input on the topmost surface. The total of the force readings is 1400, appropriately mapped or constrained depending on the application, and the location is given by (A*Aforce+B*Bforce+C*Cforce)/(total force), where Aforce, B*Bforce and Cforce are the readings from the sensors at locations A, B and C. If A, B and C, are spaced on a line at points 10, 20, and 30, then the location of the input force is approximately 22.86. In other words, these kinds of algorithms can utilize a small number of sensors to give very accurate readings, especially when one allows for a significant amount of force diffusion. More complex algorithms can calculate similar data for two-dimensional arrays, and can, with sufficient resolution, also make calculations about different kind of shapes and gestures that a hand, for example, might make in interacting with a surface. This is particularly important with non-flat topmost surfaces because the algorithms have to translate data from surfaces on different angles and be able to distinguish between different kinds of touches. The particular algorithms needed for particular applications and circumstances would be apparent to a knowledgeable person in the field. These become more complex when set enacted over time, and with multiple inputs. In the previous example, if A continues to read at 100, B at 800, but C goes up to 600, that could represent an increase in the pressure and a slight movement towards C, but if at the same time sensors D and E also went up, for example to 800 and 100 respectively, the algorithm would have to be programmed to recognize that because the two highest force locations of B and D are separated by C (indicating two inputs centred on sensors B and D), C must be making a contribution to both B and D, and it can then either average that contribution, or it can hold the contribution of C at its previous level and contribute only the added amount of 100 to the roughly D centred input. This also indicates the limit of accuracy when applied to multiple inputs close together. At the same time, one can create gestural recognition in this context. For example, if A and E are initially the centre points of two inputs, and then B and D become the centre points that represents a pinching gesture, and the algorithms can be programs to register them as such.

Although individual forces can be sensed as discussed above, changes in the signature of the sensors with time can also cause algorithms within the processor to generate certain effects, as will be discussed more broadly below. The processor processes the signals from the sensors and translates them into a processor output, which can be an electrical or optical signal, and the processor output can be used to produce a desired effect, e.g. a sound, a response on a screen, a recording of a piece of data in a memory, etc. Of course the processor output may be received by a different area of the processor, such as the recording of data within a memory area of the processor. It will be appreciated that a wide variety of other outputs and effects are possible.

The three dimensional nature of the top surface not only provides tactile feedback to the user but different parts also provide different pressure signatures to the underlying sensors. Thus the forces sensed may depend on where on the input surface the user presses, e.g. pressing (a) on a peak of a raised area of the three dimensional input surface, (b) on a trough of the same surface or (c) on a shoulder or side of the peak will usually produce different sensor output signatures. This provides a product designer with many more options for producing different outputs (and different effects) based on the particular sensor signature detected. A given interface requires careful design and calibration regarding the nature of the surface, the thickness and hardness of the material, the size and sensitivity of the force sensors, and the nature of the algorithm of that translates a processor input into a processor output.

The input surface of the interface may be an exposed surface of the soft resilient layer. However, the force transmission properties of the soft resilient layer may be modified by including one or more bodies either on the input surface or embedded within the soft resilient material. Such bodies may be harder or stiffer than the soft resilient material or indeed softer, e.g. air or gel pockets within the soft resilient material. They could also be different layers of similar material with different shapes, size and configurations, and levels of resilience. The softer or harder bodies will not only alter the sensor output signature but will also alter the tactile feedback sensed by the user.

It is also possible to embed within the soft resilient material reactive devices or actuators that will initiate positive tactile feedback to the user based on output signals either from the sensors or from the processor. An example of such a device is one that will give an audible and/or a tactile response when a signal of predetermined characteristics is generated by the sensors. For example, if one or more sensors registers a force in excess of a threshold value, such a feedback could be produced. Silicone actuators which expand when a positive charge is run through them are known and can be arrayed with the three-dimensional resilient layer to create these haptic feedback effects.

The sensors, in one embodiment, are a two-dimensional array of sensors and optionally are mounted on a hard rigid surface.

As mentioned above, when a force is applied to the input surface over an area, this force is transmitted through the soft resilient material to the sensor array and the area of the array that will "feel" the pressing force will generally be larger than the area over which the user applies the force at the input surface. The degree of the spreading of the force will depend on several factors, including the softness and hardness of the resilient material, its thickness and also which part of the surface is pressed. As discussed above, it will also depend on whether or not other bodies are included within the soft resilient material.

The minimum thickness of the soft resilient material may about 0.3 cm, e.g. at least 0.5 and generally at least 1 cm. The maximum may be 8 cm or even higher, e.g. up to 50 cm. A value that has been found to work well for most applications using finger pressure to provide the input to the interface is 2 to 4 cm. Furthermore, increasing the thickness of the soft resilient layer increases the bulk of the interface, which is itself a disadvantage. On the other hand, a thickness of less than 0.3 cm does not produce enough of a dissipation of the force applied to the input, so that the force applied to the sensor array will be very similar to that applied to the input surface. This reduces the range of pressure signatures that can be transmitted, which in turn reduces the range of effects that can be linked with those different signatures.

As mentioned, the softness of the resilient material has an effect on the dissipation of the force from the input surface to the interface and it has been found that a very soft material having a shore hardness of 00-0001 to 10, e.g. 00-005 to 00-1, such as 00-01 to 00-1 provides satisfactory results for most applications using Finger pressure to provide the input to the interface. Using a precise shore hardness is important because if the material is too hard it creates too much resistance and latency and decreases the sensitivity of the sensors, and if it is too soft, it becomes too amorphous and doesn't provide sufficient tactile feedback.

The sensors may be any sensors responsive to the user manipulating the input surface and may be pressure sensitive, in which case they may be piezo-electric crystals, strain gauges, for example, or may be made of a quantum tunnelling composite or they may be force sensitive resistors. Individual sensors and arrays of these types of sensors are widely commercially available; for example, the quantum tunnelling composite from Peratech Limited of Old Repeater Station, 851 Gatherley Road, Brompton on Swale, Richmond, North Yorkshire DL10 7JH United Kingdom and the force sensitive resistors from Interlink Electronics, Inc. of 546 Flynn Road, Camarillo, Calif. 93012, USA.

One type of product where the present invention finds particular application is electronic musical instruments, partly because they produce a wide variety of different notes and but also because sound waves have a huge number of possible variables that create identifiably different sounds and an interface that can generate a large number of different signals is required to give rise to the variables. The most important identifiably different sounds are associated with rhythmic, and pitch, and volume variations. Rhythmic variations require the capacity for discrete inputs, while subtle pitch variation requires continuous input. Pitch is especially important—rhythmic variation can be provided by discrete input in time, i.e. by providing inputs that can be distinguished in time, while in the case of pitch, one needs to be able to input discrete distinct pitches, for example to play a scale in pitch, and also to create subtle pitch variations. At the same time, every note issues at a particular volume, and minor variations in volume create the basis for important differences in the emotive quality of the music. The problem is that when there is a need for both discrete and continuous pitch and volume variations, and a two-dimensional input surface cannot provide this—one has to choose between either inputting discrete pitches, which makes the continuous impossible, or continuous, which makes the discrete more or less impossible.

In an exemplary embodiment, at least one relatively raised area is spaced above the at least one relatively recessed area by a distance of at least one mm. In an additional exemplary embodiment the three-dimensionally shaped layer of soft resilient material includes one or more harder or softer bodies with a mesh structure. The one or more harder or softer bodies with a mesh structure may be embedded within the resilient material. The one or more harder or softer bodies with a mesh structure can restrict the motion of the flexible layer in particular directions. The one or more harder or softer bodies with a mesh structure and direct pressure from particular points on the three-dimensionally shaped input surface to particular sets of sensors in the sensor array. In a still further additional embodiment, an array of sensors is provided and each sensor of the array is configured to provide an input to a processor in response to the forces applied to the input surface and sensed by the array of sensors. The array of sensors provide data to the processor which can be used by the processor to determine the location on the input surface where the forces are applied by virtue of sensors in the array that provide a non-zero input.

Since the interface of the present invention enables seamless transitions for both discrete input (e.g. inputs to generate the notes of a chromatic scale) and continuous inputs (e.g. glissando and slide effects), it is ideally suited for the complexity of harmonic, dynamic and rhythmic variation.

The interface may be in the form of a musical keyboard or other musical instruments played by touch. It may use the existing structure of an existing musical instrument and replicate them, i.e. the fundamental distribution of keys, strings, or buttons and their spatial intervals are the same as or similar to the original musical instrument, while also rendering it into a continuous 3D surface so that musicians can transfer their skills directly to a new instrument.

Without a topmost surface that can be given a 3D form moulded to any shape and the diffusion of those forces onto a sensing array, it would be impossible to give a user the capacity to utilize existing muscle memory in service of a new, much more information rich interface.

In one embodiment, the three dimensional input surface may have a wave-shape form where the peaks of the waves produce, when pressed, musical notes corresponding to the notes of a standard musical keyboard. In this way, the present invention can mimic a conventional keyboard in its operation. However, it has much greater versatility. For example, by pressing on one of the "peaks" or "crests" and vibrating a finger, an oscillating signature can be generated by the sensors, which will be interpreted by the processor as a vibrato. In addition, the shape of the surface means that a player can also play in the troughs, i.e. the areas between the crests, to produce microtonal pitches between any half or whole step. Since the input surface can be continuous, it is possible to produce smooth glissando effects on the keyboard. These particular effects can also he controlled through the software algorithms which can make the intervals in which one can play the 12 tone scale either wider, to avoid pitch bending, or narrower, to enable greater degrees of pitch bending.

Another possibility is the provision of a further section of input surface that operates in the same way as the three dimensional input surface except that it is two dimensional; it may be provided either above or below the three dimensional input so that a user can easily transfer from one to the other or use them both simultaneously. It can be programmed to enable an operator to produce a smoother glissando effect (Portamento slider). A "palm effects slider" which allows the player to generate other sounds, or control programmable aspects of the timbre of the sound using her palm, in a way similar to certain hand-drums, like tablas is also possible. This variation between sections of the interface which are wavelike or corrugated, and sections which are flat and allow for long slides is an important component in maximizing the capacity for discrete and continuous inputs into the same interface. This allows for seamless transitions between the two.

Other effects are also possible. For example, a peak of the three dimensional keyboard could be grasped or pinched, which will produce a particular signature of outputs from the sensors. This is especially the case if the grasped peak is manipulated in certain ways, i.e. pushed forward, sideways, up or down. The resulting signature can be interpreted by the processor to produce pre-set responses, for example to switch from outputting the music based on one musical instrument, for example a piano, to another form of musical instrument, for example, an organ, or even to jump between two samples of the same instrument, for example, legato and staccato samples of a violin.

The interface can include algorithms that recognise specific input gestures corresponding to different kinds of musical samples in the same way that current keyboards use different samples depending on whether they have been hit harder or softer. In this case, however, a much wider set of gestures will allow the interface to produce a large number of simulations of a wide variety of instruments and effects.

The principle of the present invention can be applied not only to musical keyboards but to simulation of any other musical instrument that are played by touch for example, a guitar or a violin. To simulate a violin or a guitar, it is possible to provide four or six peaks corresponding to the four or six strings of the instrument which will be responsive to a bowing, plucking or strumming action to produce a given sound. Similarly, different notes can be selected by the user touching the same peaks at a different part of the instrument, for example corresponding to the fret board on a standard stringed instrument.

Other effects are possible, given the selectable nature of the material from which the interface is made. For example, if the interface is made in the shape of a guitar, the neck can be made flexible to produce, for example, a vibrato sound.

The interface can be programmed in a variety of ways. One involves sending a MIDI signal each time a key is depressed, and using the initial pressure as the velocity level of the note, and the pitch bend function to control the exact pitch. If the signal then changes the MIDI note can remain on and the volume and pitch can be continuously adjusted. This is in effect more like volume and pitch 'aftertouch'. Another way of programming the interface involves sending a new MIDI note with each pressure reading and simply changing the pitch level and the volume and velocity of every note. This method results in a more intuitive sound, but can give the sound a sense of texture. This texture can be corrected or accounted for by sending the MIDI notes at a frequency that approximates the natural waveform of the sound which one is trying to replicate. The interface can function with a variety of protocols and is not in any way limited to MIDI or these two approaches.

Of course the present invention can also be used to create musical instruments with entirely new form factors, not merely for replicating the standard form of existing instruments in a new material. New forms can allow for new functions and new ways to integrate functions.

The present invention is not limited to interfaces corresponding to musical instruments but can be applied to many other types of interfaces, for example computer keyboards to input alpha numeric characters or word or number processing functions. It is also possible to include within the interface a pointing device similar to a mouse. This may be provided for example, by a peak that can be grasped and pulled sideways, forward or back to control a pointer on a screen.

The interfaces of the present invention can be used in other products which require a level of skill, since they can provide a high level of functionality that can only be achieved with a certain amount of practice. However, they could also be very useful for the elderly, or people with disabilities, because, using software, they can be tailored to the capacities of distinct users to respond to individual gestures. Their tactile quality makes them well suited to people who are either visually impaired or have more limited motor-control.

One important aspect of the present invention is that it can be used as an interface for programmable gestures. In other words, a user could activate a setting on the processor the record a gesture and then touch the interface in a particular, unique way, and then instruct the processor that when that gesture is performed on the input surface the processor will activate a given command. This would allow individuals, and software programmers, a wide variety of options to play with, and a given interface could be tailored in software to precisely fit the needs of a given user. As mentioned above, this might have particular applications for the disabled, as well as for a broader market.

The term "gestures" signifies a pattern of touching or pressing the input surface with the user's fingers or hand, including a pattern of moving the fingers or hand over the input surface. Thus gestures can include using the fingers to pinch, squeeze, push or pull part of the input surface in a particular way. The processor could be programmed to respond to a particular gesture by performing a particular command. Thus when any gesture is performed that resembles that stored in the processor, the processor could respond in a particular way. The gestures could be "programmed" into the processor by the user. A user could in essence "record" a given force signature as a particular "gesture" and then this could represent a particular kind of command. The interface would then be open to revision by the user not through a technical recoding of the fundamental program, but by simply saving a set of gestures into the processors memory that could tailor the functions of the interface to the particular needs and habits of a user. If for example, an upper-limb amputee wanted to use this kind of interface as a mouse, one kind of input into the top surface could control the moment of the arrow on screen, and another kind of "gesture" into the surface could be easily programmed to register a click.

The three-dimensional quality of the topmost surface can also be moulded to fit exact irregular shapes and sizes. In the field of prosthesis, for example, there are currently robotic arms which allow for a high degree of articulated movement, including gripping at different levels of force, and making distinct gestures. Currently these prosthetic arms are usually controlled by electrodes. These send surface myographicelectric signals from the end points of the residual muscle tissue. These solutions often involve sequences of unintuitive movements and are never entirely natural and intuitive for the user. In the case of this invention, a soft material can be cast to form to the exact shape of the residual stump of the arm. Exact fitting is crucial for comfort and ease of use, and other pressure sensing solutions which do not involve complex three-dimensional input surfaces would not be suited for these kinds of applications.

As mentioned above, the internal membrane between the three-dimensionally shaped input surface and the sensors can be made of a variety of different materials and can comprise a variety of different shapes and hardness to achieve a variety of desired effects. Using such an internal membrane to more accurately distribute pressure location is well known. Such techniques can be amplified and developed in the manner of the present invention, however, to detect small variations in exact locations on a three-dimensional input surface and to channel them to sensors lying on either a two or three dimensional substrate surface.

This can be a kind of internal scaffolding structures which also enables or inhibits particular kinds of motion and input into the surface. Because the three dimensional internal flexible layer is in some application relatively thick, there are situations where one would want to restrict motion in a particular direction or strengthen a soft material. In such cases one can create a scaffolding or internal armature into a mesh. The exact form of the mesh can be varied according to the desired strength, restriction of motion, and sensing effects. Using an internal mesh within a softer material is a known technique, but in the present invention the mesh can also be used to simultaneously strengthen restrict the motion of a three dimensional shaped soft interface, and direct the forces on the three-dimensional input surface towards the sensor array.

The scaffolding can pinpoint pressure sensitivity in particular locations and relay that directly to arrays of sensors thus giving very accurate readings of tiny variations on a three-dimensional input surface. Such a scaffolding system can in some instances also be cast with a resistive material like an ink-form of Quantum Tunnelling composite, and this can in turn make possible instances of invention in which there is no need for a rigid array of sensors underneath. The internal scaffolding can he made using rapid prototyping techniques which can allow for highly precise bespoke solutions tailored to meet individual needs.

In the case or a prosthetic limb control system, for example, an internal scaffolding can be used to localize pressure output from particular muscle end-points onto particular sensors. This can enable to user to make intuitive gestures relating to the movement the missing hand, for example, and the program can then adjusted to recognize those gestures and send the right kind of data to the robotic arm.

The interface of the present invention provides the responsive tactile feedback of keyboards and keypads—with the continuous input control of touch screen and touch pads. It then adds localized pressure sensitivity, particular three-dimensional forms to the input surface to allow for a range of desired inputs, and an internal scaffolding system where necessary to pinpoint force sensitivity to exactly where it is needed. The possibilities associated with bringing these categories of interface together into a new typology are enormous.

BRIEF DESCRIPTION OF THE DRAWINGS

The present invention will now be described in further detail, by way of example only, by reference to the accompanying drawings in which.

DETAILED DESCRIPTION

Figure 1:
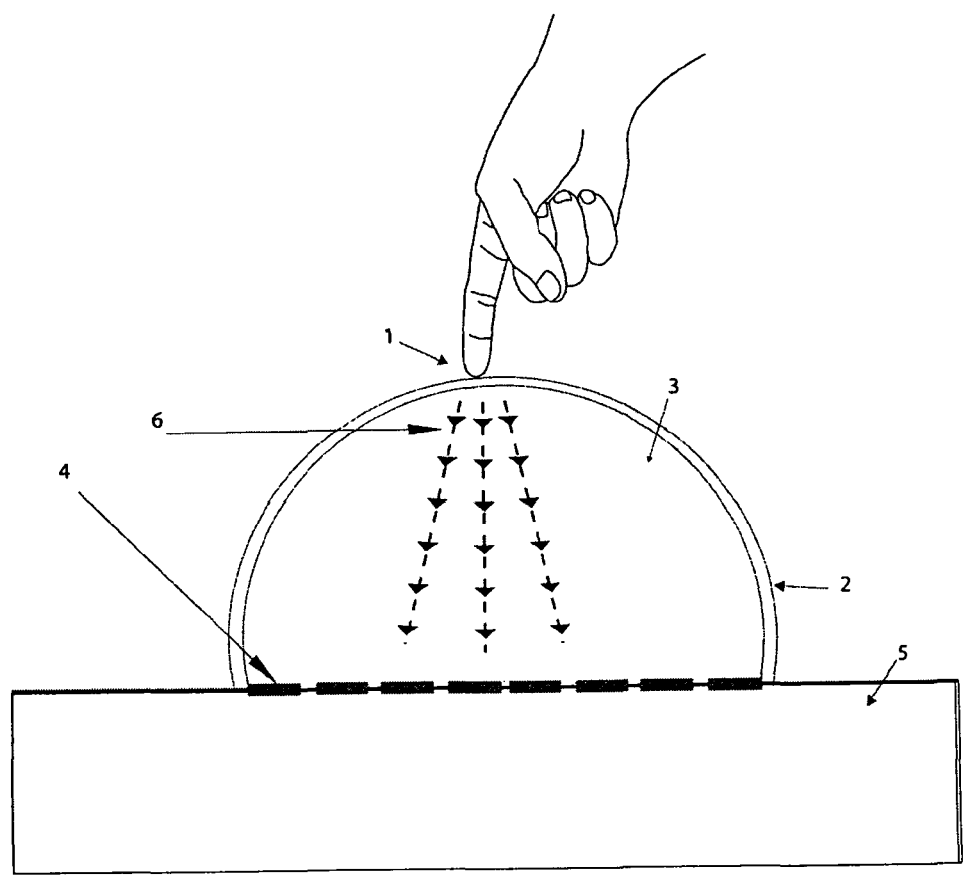
FIG. 1 is a cross-sectional drawing of one possible formation that the components of a generalised interface in accordance with the present invention might take, integrating an input surface with a three-dimension shape, a flexible internal layer with a three-dimensional shape, and a two-dimensional sensor array.

Referring initially to FIG. 1, which is a cross-sectional drawing of one possible formation that the components of a generalised interface in accordance with the present invention might take. It includes an illustrated point of contact 1 between a user and three-dimensionally shaped input surface(s) 2. Between the three-dimensionally shaped input surface(s) 2 and two-dimensionally arrayed sensor array 4 there is a three-dimensionally shaped internal flexible layer 3 which Matches the contours of the input surface 2 and the sensor array 4. The sensor array 4 is situated on hard backing surface(s) 5. Also shown are illustrated lines of forces diffusion 6 from illustrated point of contact 1 and sensor array 4.

Figure 2:
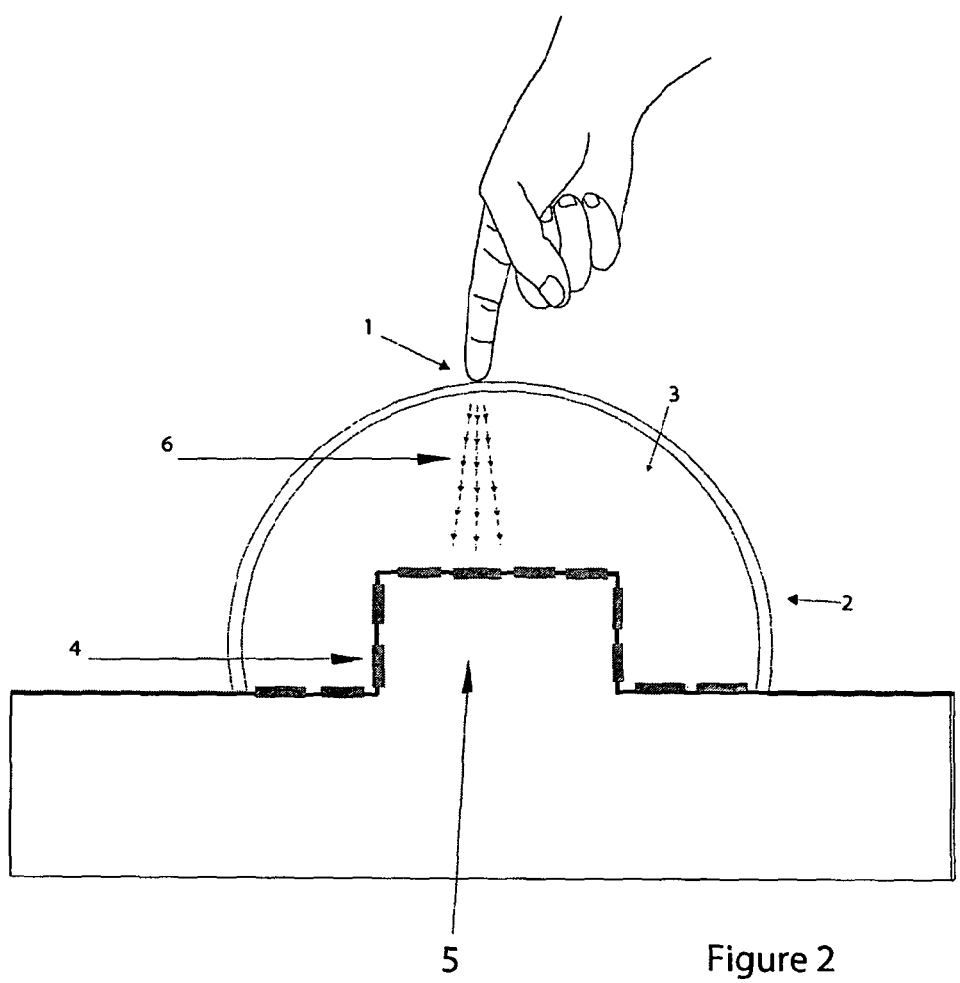
FIG. 2 is another cross-sectional drawing which provides a variation on FIG. 1 which highlights the fact that in some instances the sensors can also be array on three-dimensional shapes, (or multiple two dimensional surfaces which amount to a three dimensional array).

Referring now to FIG. 2, it can be seen that the sensor array 4 can be situated on multiple two-dimensional surfaces which amount to a three dimensional array. The hard backing surface(s) 5 is also shaped to find the form of the sensor array, and as a result, the resilient layer 3 takes on a more complex three-dimensional character. The spatial relationship between the three-dimensionally input surface(s) 2 and the three-dimensional sensor array 4 can be optimized according to specific applications to maximize the range and accuracy of different kinds of force signature inputs and user gestures.

Figure 3:
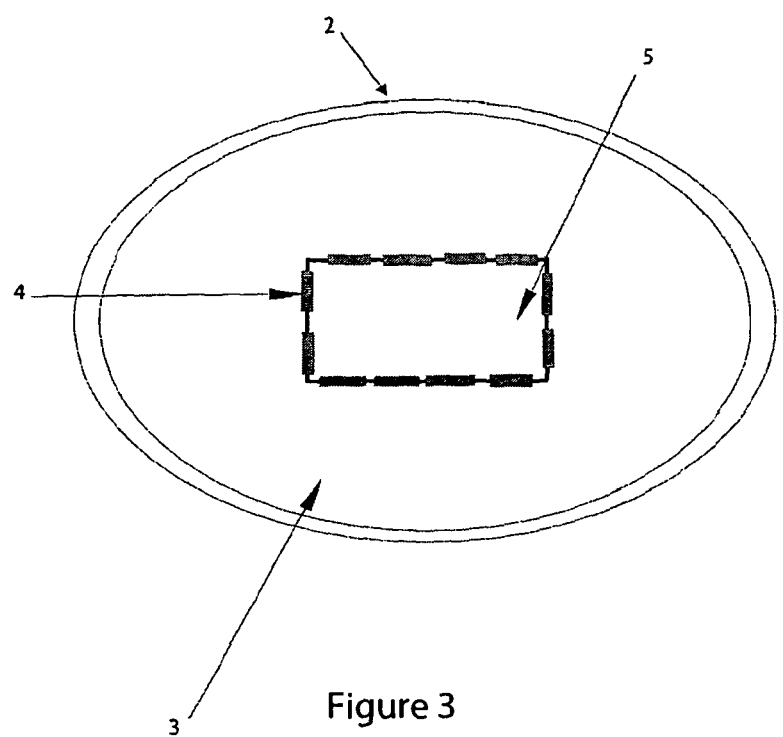
FIG. 3 is a further cross-sectional drawings which provides another variation, and demonstrates that the input surface can be an entirely enclosing three dimensional shape and the sensors can be arrayed on a multi-surface three dimensional object.

FIG. 3 is another cross-sectional drawing which shows another possible arrangement of the components of the present invention. In this drawing, the three-dimensionally shaped surface(s) 2 entirely enclose the other components, including the three-dimensionally shaped flexible internal layer 3 and the three-dimensional sensor array 4, and the hard backing surface(s) 5. This arrangement allows for a range of different forms of user manipulation, including squeezing and stretching inputs into three-dimensionally shaped input surface(s) 2, and also pressing the entire interface onto an external hard surface like a table. The three-dimensionally shaped surface(s) 2 can of course be one continuous shape or several connecting surfaces, and can have further textural details like ridges, protrusions, recesses, raised areas and any other complex shapes as is called for by the design or function of the particular application.

Figure 4:
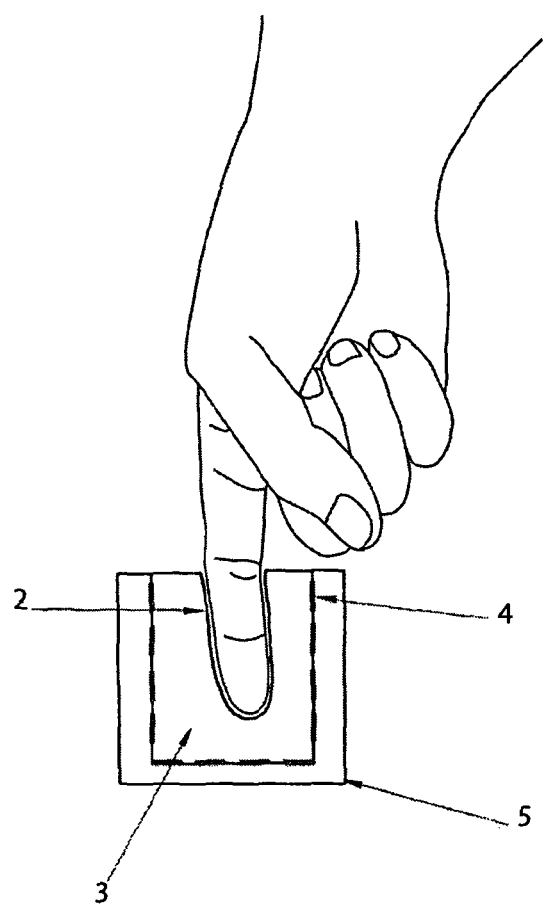
FIG. 4 is a cross-sectional drawing which shows an instance of the present invention in which the input surface is a recessed area and it is surrounded by the flexible force diffusing layer, and indeed a surrounding three-dimensional pressure sensing array.

FIG. 4 shows a cross-sectional view of a version of an interface of the present invention in which three-dimensional shaped input surface(s) 2 exist in an inverted configuration relative to the other drawings, such that three-dimensional shaped input surface(s) 2 are within three-dimensionally shaped flexible 'internal' layer 3, and three-dimensionally shaped flexible 'internal' layer 3 is in turn within both three-dimensional sensor array 4, and three-dimensionally arrayed hard backing surface(s) 5. This arrangement can increase the surface area of the point of contact between the user and three-dimensional shaped input surface(s) 2, which can allow for even more subtle registration of movement. In this arrangement it is sometimes necessary for three-dimensionally shaped flexible 'internal' layer 3 to be made of a softer, more gel-like material than in other arrangements, since there is less scope for the material to flex, and compress.

Figure 5:
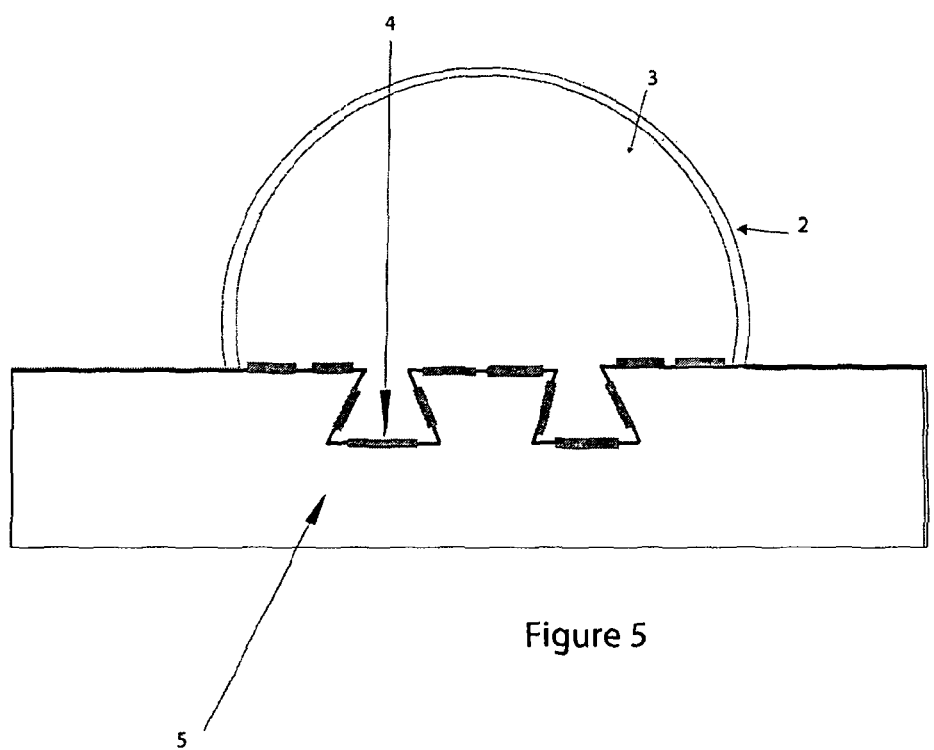
FIG. 5 is cross-sectional drawing which shows that the sensors can also be arrayed on complex three dimensional shapes, in this to provide another degree of freedom of movement i.e. to create a force sensor that simultaneously responds to pushing and pulling.

Referring now to FIG. 5, it can be seen that three-dimensional sensor array 4 can also be constructed with inverted three-dimensional shapes. This carries with it an important added benefit, which is that the it is one way of using the present invention to make a six degrees of freedom pressure-sensing device. One can pull upwards on three-dimensional shaped input surface(s) 2 and the force is translated through three-dimensionally shaped flexible 'internal' layer 3 onto the sensors of three-dimensional sensor array 4, which are arrayed against the now complexly shaped hard backing surface(s) 5.

Figure 6:
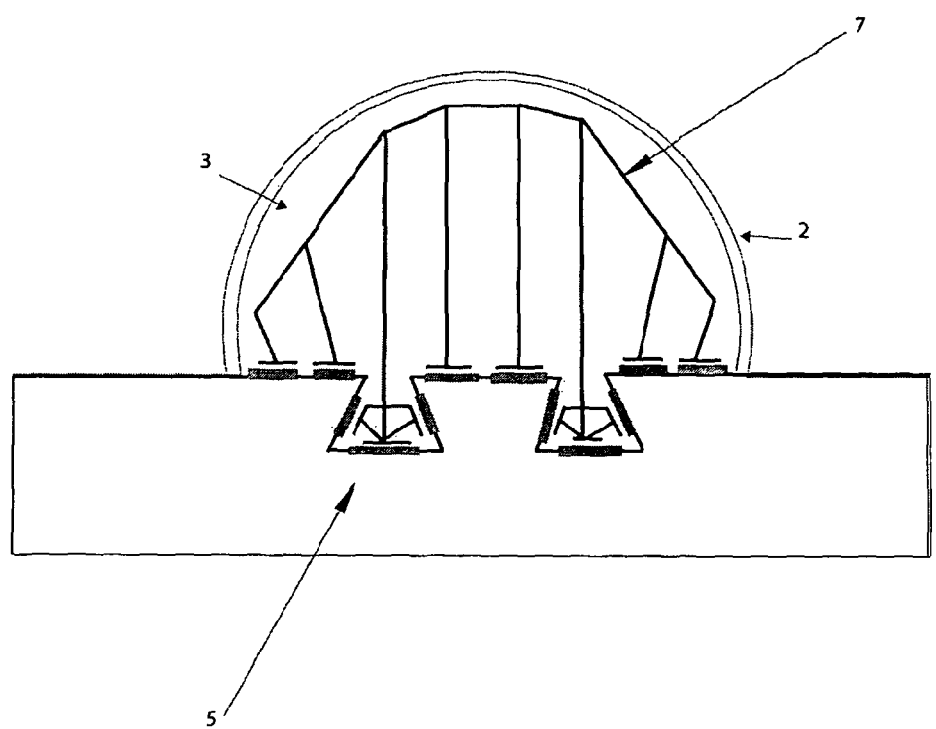
FIG. 6 is a cross-sectional drawing which shows the same arrangement as FIG. 5, but adds in an internal scaffolding which is cast inside the resilient layer, the purpose of which is both increase the distribution of forces from particular points onto multiple sensors to give more accurate and detailed readings, and to make a more robust framework for manipulation in multiple directions.

In FIG. 6, the cross-sectional drawing shows an arrangement similar to that of FIG. 5, with the addition of internal scaffolding system 7. The internal scaffolding can be cast inside three-dimensionally shaped flexible 'internal' layer 3, and can both increase the distribution of Forces from particular points onto multiple sensors to give more accurate and detailed readings, and make a more robust framework for manipulation in multiple directions. It can ensure that the pulling forces, for example, are appropriately translated onto the appropriate inverted sensors of three-dimensional sensor array 4, and that the force diffusing qualities that come into play when pushing on the material don't reduce the accuracy in the case of pulling. The internal scaffolding system must have a certain degree of flexibility to function in this arrangement, but it must also be harder/stiffer than three-dimensionally shaped flexible 'internal' layer 3. Nylon or higher shore hardness types of silicone are two materials which have been found to work well in these arrangements. In certain instances, force sensors and other resistive material can be built onto, or encapsulated within, this scaffolding, especially in cases where one desires a more completely flexible information-rich pressure sensitive interface.

Figure 7:
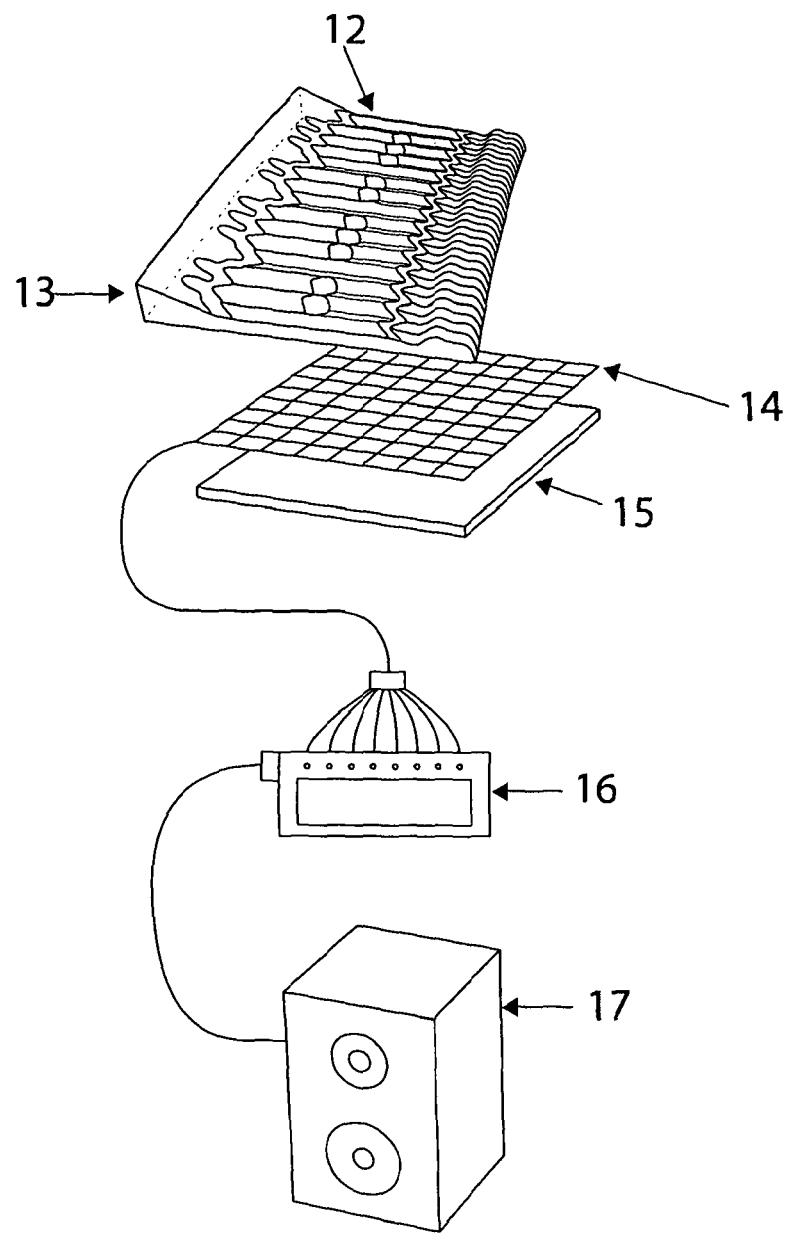
FIG. 7 is a schematic exploded drawing of one possible iteration of the whole system of the present invention.

FIG. 7, is a schematic exploded drawing of the components of a generalised interface in accordance with the present invention. It includes a three-dimensionally shaped flexible layer 13 of a soft resilient material, silicone rubber, having a three-dimensionally shaped input surface 12. The body has a planar bottom surface 19, which rests on an array of sensors 14 that is supported on a rigid surface 15. Each of the sensors of the array 14 is pressure sensitive and can produce an output in accordance with the pressure exerted on it. The output from the various sensors is conducted via a lead to a microprocessor 16. The microprocessor includes algorithms that respond to certain combinations of signals from the sensors of the array 14 to produce an output driving a component, which in this case is a loud speaker 17. In many particular arrangements a small microprocessor, which could be, for example, an Arduino processor, will first interpret the data from the force sensors into a form that can be read as an input by a more advanced processor like a computer. The computer can then run the code that translates the basic numerical data of particular forces on particular sensors into a meaningful output. Such translation can be achieved by a variety of software solutions, again depending on the nature of the application and the desired output. For example, the data could be interpreted into particular outputs in a Java-based language like Processing, or a C++ based language like Open Frameworks, among many others.

Figure 8:
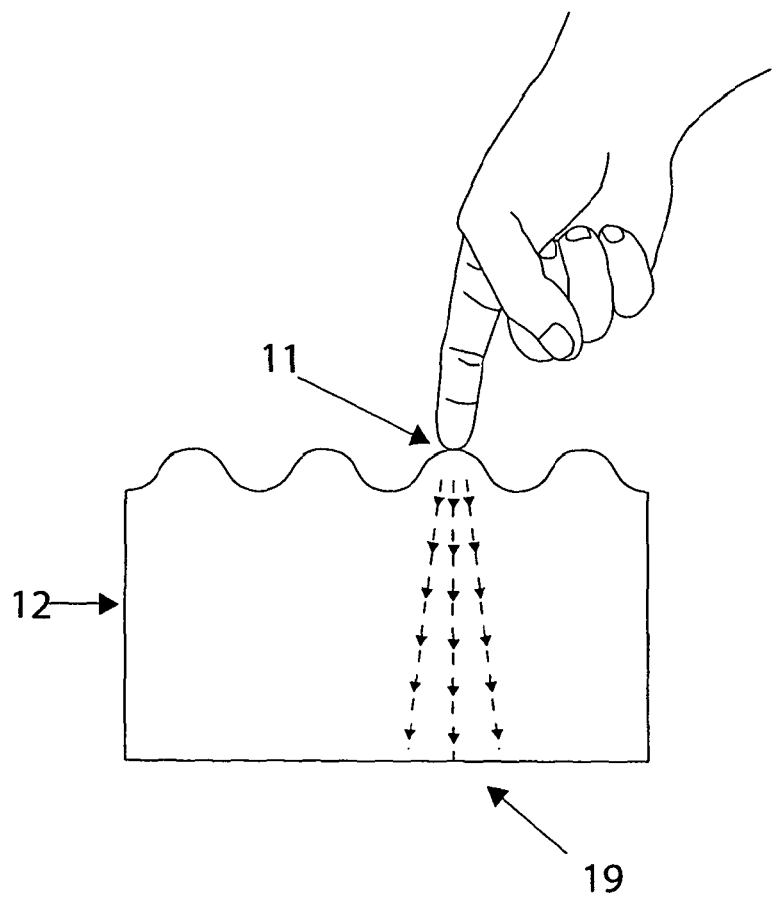
FIG. 8 is a close-up view of part of the surface in FIG. 9.

Referring now to FIG. 8, which shows a simplified and schematic small section of three-dimensional shaped input surface(s) 12 it can be seen that the pressing 11 of a peak on the undulating surface 12 of the soft resilient body 13 transmits the force through the body to the planar surface 19, which is in contact with an array of force sensors as seen in FIG. 7. The force spreads out, as shown schematically by arrows, so that the area of the planar surface that "feels" the force on the three-dimensional shaped input surface(s) 12 has a greater area than the area pressed on the top surface. The microprocessor 16 (FIG. 7) detects which sensors in the array are providing the signal, and the software algorithms can interpret the relative forces on each sensors to reconstruct the exact location of the input. Once the input data has reconstructed, the software then creates a set of software 'objects' which can keep track of a set of simultaneous inputs, and can compare each continuing input with the inputs from the previous loop of the program. Depending on the nature of the application and the desired level of discreteness or continuity between inputs, algorithms can be set to measure the level of continuity which is necessary for the program to interpret a given input as being continuous with an input from the previous loop or instead constituting a new input. These comparative markers are optimally built into the input-interpreting software objects. For example, a software object that initially interprets the data from the sensor array will often need to track several variables at the same time, including the reconstructed input location, the reconstructed input location from the previous loop of the software, the pressure at the present input location, the pressure at the previous input location, the numerical order in which the program register this input in relation to other simultaneous inputs, and, in the case of certain desired effects, the 'width' of the input—i.e. the number of sensors which contributed to the reading of the particular input location. Obviously the objects have to be coded in such a way that a set can simultaneously be interpreted. Each time the loop is run, the program can then compare each present input cluster with previous input cluster. Then once the data has been assessed at that level, the input data objects can trigger particular control effects, whether they be audio, visual, or based on movement or anything else. For example, in the example in FIG. 9, the input data objects can be directed to send MIDI notes on and off which then produce a signal to the loud speaker 17 corresponding to a musical note. The change in the data between loops can, for example, either be used to send a new note, or to hold the existing note, increase its volume, or bend its pitch, depending on the desire sound and the comparative statements built into the code. Simply put, the program can be written such that the pitch and timbre of the musical note depends on the location on the undulating surface 12 that is pressed by the user. The volume of the note produced can be set in accordance by the magnitude of the pressure sensed by the sensor array 14. Variations on these techniques for the purpose of other applications will be clear to a skilled programmer of control interlaces.

The materials used in the keyboard are as follows:

The body is made of silicone rubber, specifically Silskin 10 produced by Notcutt Ltd (Homewood Farm, Newark Lane, Ripley, Surrey GU23 6DJ) with added deadener silicone additive (also available from by Notcutt Ltd) to produce a material with a shore hardness on 00-1.

Figure 12:
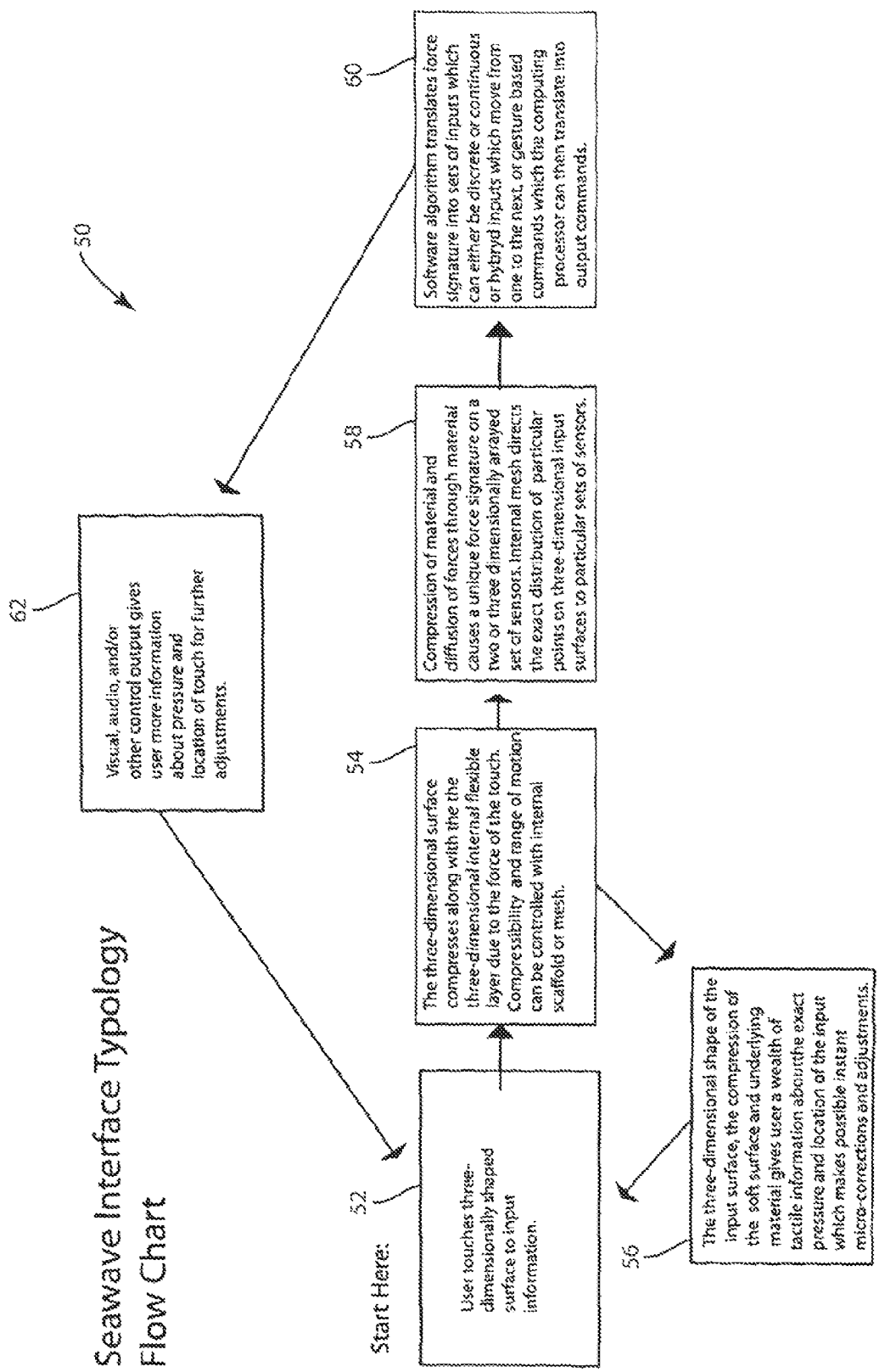
FIG. 12 is a flow diagram showing the general operation of steps of the present invention of which the keyboard of FIG. 9 is an example.

The array of sensors 4 is formed from FSR strip produced by Interlink Electronics The processor 16 is an Arduino microprocessor produced by Tinker The flow diagram of FIG. 12 shows the sequence of the above-described operation of the interlace (steps 1 to 4A).

In one embodiment, the peaks can correspond to the notes on a standard keyboard. However, it is also possible to press the trough between the peaks, which will be detected by a different combination of sensors to produce different pitches, e.g. microtonal effects, or other effects depending on the nature of the algorithms software which interprets the data. Other effects that can be produced have already been discussed above and so will not be repeated here.

Figure 9:
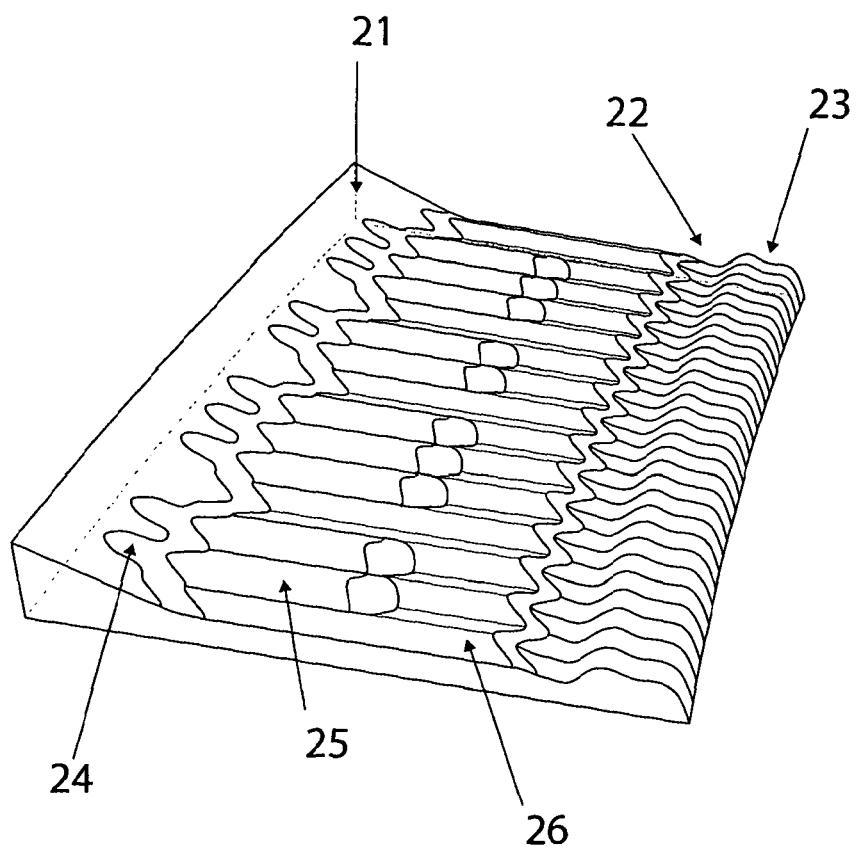
FIG. 9 is a view of one possible configuration of the input surface of a musical keyboard in accordance with the present invention.

FIG. 9 shows a keyboard in accordance with the present invention showing not only white notes (peaks 26) but also black notes (peaks 25). In addition, touch sensitive surfaces 21, 22 and 23 (or "sliders") are provided above and below the keyboard that provide glissando effects when a user slides a finger, thumb or palm along it. 21 is a portamento slider, 22 is a further lower portamento slider and 23 is a palm effects slider. Indentations 24 are provided where the keys 25, 26 meet the portamento slider 21 to provide a smooth transition surface for moving a finger smoothly (i.e. without encountering obstacles) between the main area of the keyboard (keys 25,26), and the slider 21. There arc other ways that one can create the particular surface of the sliders depending on the precise effects and transitions one wants to achieve.

Figure 10:
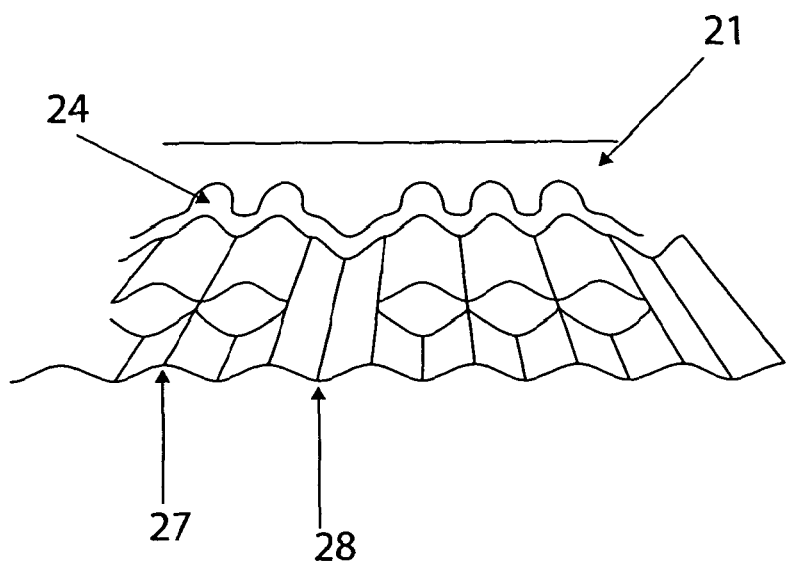
FIG. 10 is a view of the possible configuration of the input surface of FIG. 9.

FIG. 10 shows part only of the keyboard of FIG. 9 and in particular shows the peaks 27 and troughs 28 between the white and black notes.

Returning now to FIG. 9, it can be seen that the peaks can be oscillated by the finger to produce a vibrato effect or could be grasped or pinched to produce a sound that cannot be achieved using a standard keyboard. The softness of the material also means that once the surface has been depressed one can either move one's finger and slide it across the material, or one can use the flexibility of the internal layer to push the material one way or another thus giving a different reading on the underlying sensor array. Enabling this technique is important because it mean that the effects of vibrato and tremolo can be used simultaneously.

Figure 11:
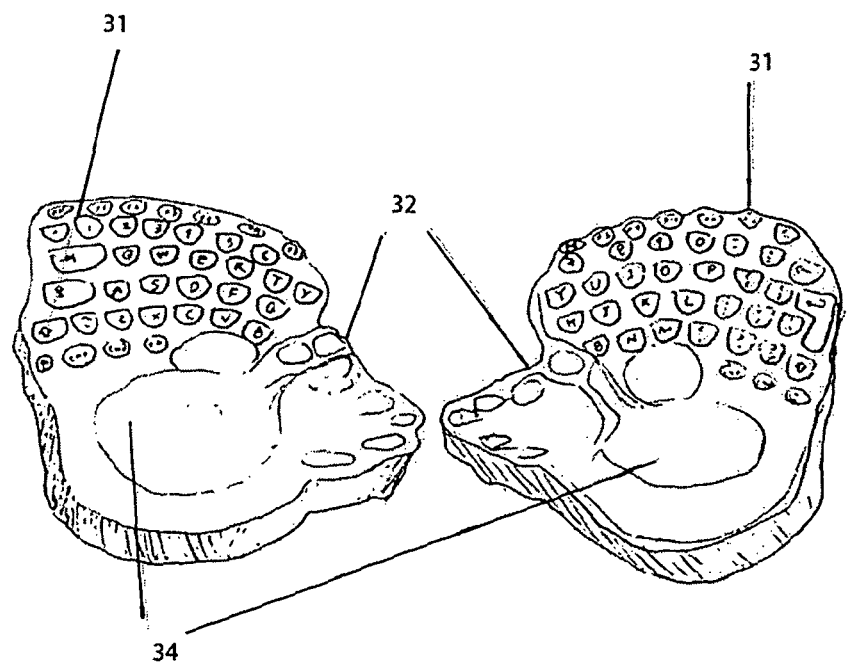
FIG. 11 shows a keyboard-like tactile interface that can be used to input alphanumeric characters and/or to word or number process them, as well as control the cursor tracking, although other computer-related functions can also be driven from the interface.

Referring now to FIG. 11, there is shown the equivalent of a computer keyboard, which has been divided into two sections, one for each hand. The top surfaces of the two keyboard parts carry elevated areas 31 corresponding to alphanumeric keys and function keys; the elevated areas can be felt by the user and so provide tactile feedback. The keyboard has a similar structure to that shown in FIG. 9 so that, when a key is pressed, a force is transmitted though soft resilient material to an array of sensors (not shown). From the combination of sensors that is triggered by a downward pressure on the top surface, it is possible to tell which key has been pressed and this detection is performed in a microprocessor, which produces an output signal causing an alphanumeric character corresponding to the pressed key to be displayed on a screen and a corresponding character to be stored into a memory, FIG, 12 is a flow diagram 50 showing the general operational steps of an exemplary embodiment of the interface as disclosed herein. At 52 a user touches the three-dimensionally shaped input surface to input information. In doing so, the user applies a force or a combination of forces to an area selected by a user of the input surface. In the exemplary embodiment depicted m FIGS. 8-10, the input surface is in the shape of a keyboard, while in the exemplary embodiment depicted in FIG. 11, the input surface is in the shape of an alphanumeric keyboard.

At 54, the force or combination of forces applied by the user to the selected area of the input surface causes the three-dimensional surface to compress along with a three-dimensional internal flexible layer due to the force. The presence or absence of an internal scaffold or mesh and the construction thereof may change the manner in which the three-dimensional internal flexible compresses.

At 56, the three-dimensional shape of the input surface and the compression of the soft surface and underlying material gives the user a wealth of tactile information about the exact pressure and location of the input being made by the user. This tactile feedback to the user makes possible instant micro-directions and adjustments by the user to the touch input, exemplarily at 52.

At 58, the compression of the material and diffusion of the force or combination of forces applied by the user to the selected area of the input surface through the material causes a unique force signature on a two or three-dimensionally arrayed set of sensors. In embodiments that include an internal mesh, the internal mesh directs the exact distribution of forces to particular points on the three-dimensional input surfaces to particular sensors or sets of sensors. The output from the various sensors is conducted via a lead to a microprocessor. The sensors generate an input to the processor, the input conducted to the processor contains data regarding the magnitude of the force or forces applied to the input surface and the location on the input surface where the forces are applied.

At 60, at least one software algorithm operating on the processor translates the force signatures from the sensors into sets of inputs which can either be discrete or continuous inputs. Additionally the force signatures can be translated into hybrid inputs which move from one input to the next. Still further force signatures can be translated into gesture based commands. The computer processor translates the sets of input into output commands. To generate the output commands, the processor generates a signal in accordance with the algorithms stored on the processor in response to the signals from the sensors of array of sensors making up the force signatures.

At 62, the output commands provided from the processor to visual, audio, or other devices. The control of the output by the visual, audio, or other device further gives the user more information about pressure and location of the user's touch inputs to the input surface and enables the user to further adjust those inputs.

The two parts of the keyboard shown in FIG. 11 correspond in shape to the user's right and left hands. A region 34 corresponds to the place where a user will place his palm. A pointer (cursor) on the screen can be moved by the user exerting a pressure on this section 34; the pressure will be detected by the array of sensors and the cursor moved in accordance with the direction of the force exerted by the user in the area 34, as detected by the signature of sensor signals. Because the material used for making the keyboard is soft, the different signatures corresponding to the different directions of the pressure exerted by the user on the region 34 can readily be detected by the sensors even if the palm of the hand does not move across the surface in the region 34. Thus the palm can control the mouse function of directing the cursor on screen.

It is also possible to provide peaks, for example peaks 32, that can be squeezed between the user's thumb and forefinger to perform functions on the screen, for example to pick up an object displayed on the screen and drag it to a different location.

It is possible to provide control, shift and command functions not only by pressing buttons but also by specific gestures performed in connection with the individual keys.

These slightly more detailed examples indicate the range of applications that fall within the scope of the present invention. A person knowledgeable in the field of interface design could appreciate the breadth of possible applications that the present invention makes possible. To give just one example, although the present invention has been described in connection with user who directly touches the three-dimensional input surface, certain applications can be constructed using a similar interface which is utilized in a mechanized context, for example in a robotic context where three-dimensional force sensitive input devices can be used to create more sensitive moving joints that can sense the relative distribution of weight and can be formed to fit the mechanical parts. In these applications, the scaffolding system depicted in FIG. 6 provides an especially useful tool since it can enable movement and sensitivity in certain directions, and restrict movement in other directions, while remaining lightweight and durable. Thus a range of applications in robotics fall within the scope of the present application.

What is claimed is:

1. An interface for inputting data into a processor, the interface having an input surface and comprising:
    an array of sensors responsive to forces applied to the input surface, the sensors of the array of sensors being configured to provide an input to the processor that contains data regarding the magnitude of the forces applied to the input surface and the location on the input surface where the forces are applied, the array of sensors extending in at least two dimensions and the array of sensors having a top, a bottom, and a side,
    a layer of soft resilient material enclosing the array of sensors and capable of transmitting forces exerted on the input surface to the sensors,
    wherein the input surface of the interface has a three dimensional shape made up of at least one relatively raised areas and at least one relatively recessed areas; and
    wherein the three-dimensionally shaped input surface encloses the array of sensors from the top, the bottom, and the side of the array of sensors.

2. An interface as claimed in claim 1, wherein the layer of soft resilient material is such that it diffuses a force applied to an area of the input surface over a wider area of the sensor array causing a number of sensors within said array to register that force.

3. An interface as claimed in claim 1, wherein the three-dimensionally shaped input surface is convex or concave or made up of a series of convex and concave elements which together form a three dimensional shape.

4. An interface as claimed in claim 1, wherein the three-dimensionally shaped input surface is inverted and the flexible layer and sensor array is on the outside.

5. An interface as claimed in claim 1, wherein the three-dimensionally shaped input surface has a shape made up of a smooth continuous three-dimensional surface.

6. An interface as claimed in claim 1, wherein the at least one relatively raised area is spaced above the at least one relatively recessed area by a distance of at least 1 mm.

7. An interface as claimed in claim 1, wherein the thickness of the soft resilient layer and the spacing between sensors are such that a force applied at any point on the input surface will be detected by at least one sensor.

8. An interface as claimed in claim 1, wherein the soft resilient layer has a minimum thickness of at least 0.3 cm.

9. An interface as claimed in claim 1, wherein the soft resilient material has a shore hardness of 00-001 to 10.

10. An interface as claimed in claim 1, wherein the layer of soft resilient material comprises one or more harder or softer bodies with a mesh structure embedded therein, and the bodies can restrict a motion of the flexible layer in particular directions and ways.

11. An interface as claimed in claim 1, wherein the layer of soft resilient material comprises one or more harder or softer bodies with a mesh structure that can direct pressure from particular points on the three-dimensionally shaped input surface to particular sets of sensors in the sensor array.

12. An interface as claimed in claim 1, wherein the input surface of the interface is a surface of the soft resilient layer.

13. An interface as claimed in claim 1, wherein an array of sensors is provided, each sensor of the array being configured to provide an input to a processor in response to the forces applied to the input surface and sensed by it and wherein the array of sensors provides data to the processor which can be used to determine the location on the input surface where the forces are applied by virtue of the sensors in the array that provide a non-zero input.

14. An interface as claimed in claim 1 in the shape of a musical instrument configured to be played by touch.

15. An interface as claimed in claim 1 in combination with a processor for processing the signals from the sensors in accordance with an algorithm or algorithms to provide:
    an output, such as a signal driving a speaker to produce a sound, or
    a signal representative of alphanumerical characters or word or number processing functions or
    signals providing remote movement or remote control of objects in real space or in a virtual environment.

16. An interface as claimed in claim 1, wherein the processor is programmable by a user to generate certain processor output signals in response to a specific combination of forces applied to the input surface or in response to specific changes in the forces applied to the input surface.

17. A method of producing a processor signal from a processor by manipulating an interface, the interface being as claimed in claim 1, the method comprising applying a force or a combination of forces to selected areas of the input surface, thereby causing the sensor or sensors in the interface to generate an input to the processor, the input containing data regarding the magnitude of the force or forces applied to the input surface and the location on the input surface where the forces are applied, wherein the said processor generates a signal in accordance with algorithms stored in the processor in response to signals from the sensor or the array of sensors.

18. An interface for inputting data into a processor, the interface comprising:
- an input surface having a three dimensional shape having at least one relatively raised area and at least one relatively recessed area;
- a layer of soft resilient material extending from the input surface and resiliently defining the three dimensional shape of the input surface;
- an array of sensors enclosed within the layer of soft resilient material, the array of sensors responsive to forces applied to the input surface and translated to the sensors through the layer of soft resilient material, the sensors of the array of sensors being configured to provide an input to the processor that contains data regarding a magnitude of forces applied to the input surface and a location on the input surface where the forces are applied.

19. The interface of claim 18, wherein the array of sensors has a top, a bottom, and a side and the layer of resilient material encloses the top, the bottom, and the side of the array of sensors.

20. An interface for inputting data into a processor, the interface having an input surface and comprising;
- a three dimensional array of sensors responsive to forces applied to the input surface, the three dimensional array of sensors being configured to provide an input to the processor that contains data regarding a magnitude of the forces applied to the input surface and a location on the input surface where the forces are applied;
- a layer of soft resilient material overlaying the three dimensional array of sensors between the three dimensional array of sensors and the input surface and the layer of soft resilient material transmits a force exerted on the input surface to a plurality of sensors of the array of sensors;
- wherein the input surface of the interface has a three dimensional shape made up of at least of a relatively raised area and a relatively recessed area.

* * * * *